US010717409B2

(12) United States Patent
Bode

(10) Patent No.: US 10,717,409 B2
(45) Date of Patent: Jul. 21, 2020

(54) METHOD FOR A TWO-STAGE AUTHORIZATION OF A CHARGING PROCESS ON A CHARGING POST

(71) Applicant: EcoG GmbH, Oberhaching (DE)

(72) Inventor: Sebastian Bode, Ahlen (DE)

( * ) Notice: Subject to any disclaimer, the term of this patent is extended or adjusted under 35 U.S.C. 154(b) by 0 days.

(21) Appl. No.: 16/607,709

(22) PCT Filed: Jan. 8, 2018

(86) PCT No.: PCT/EP2018/050378
§ 371 (c)(1),
(2) Date: Oct. 23, 2019

(87) PCT Pub. No.: WO2018/197053
PCT Pub. Date: Nov. 1, 2018

(65) Prior Publication Data
US 2020/0130643 A1    Apr. 30, 2020

(30) Foreign Application Priority Data

Apr. 25, 2017  (DE) .................. 10 2017 206 948

(51) Int. Cl.
*H04B 5/00*     (2006.01)
*B60R 25/00*    (2013.01)
(Continued)

(52) U.S. Cl.
CPC .......... *B60R 25/002* (2013.01); *B60L 53/305* (2019.02); *B60R 25/24* (2013.01);
(Continued)

(58) Field of Classification Search
CPC . B60R 25/002; B60R 25/24; B60R 2325/101; B60R 2325/103;
(Continued)

(56) References Cited

U.S. PATENT DOCUMENTS 5,548,200 A * 8/1996 Nor .................. B60L 53/305
                                                    320/109
6,157,162 A * 12/2000 Hayashi ............ H02J 7/0027
                                                    320/104
(Continued)

FOREIGN PATENT DOCUMENTS

DE    102011010774 A1    8/2012
DE    102011083065 A1    3/2013
(Continued)

OTHER PUBLICATIONS

International Search Report in PCT/EP2018/050378, dated Apr. 5, 2018.

*Primary Examiner* — Sonny Trinh
(74) *Attorney, Agent, or Firm* — Seyfarth Shaw LLP; Puya Partow-Navid

(57) ABSTRACT

The method for a two-stage authorization of a charging operation includes a first stage and a second stage. In the first stage, a control device allocated to the charging station receives a terminal-side proof of authorization transmitted from a mobile terminal device. The first personal authorization of the charging station user is verified on the basis of the terminal-side proof of authorization, without any action of the charging station user being required. With the given first authorization, the charging cable is released. In the second stage, the vehicle-side proof of authorization is received and verified after the vehicle has been connected to the charging cable, whereupon in response to verification of the vehicle-side proof of authorization, a second authorization is carried out, due to which the charging operation is approved.

20 Claims, 2 Drawing Sheets

Figure 1:
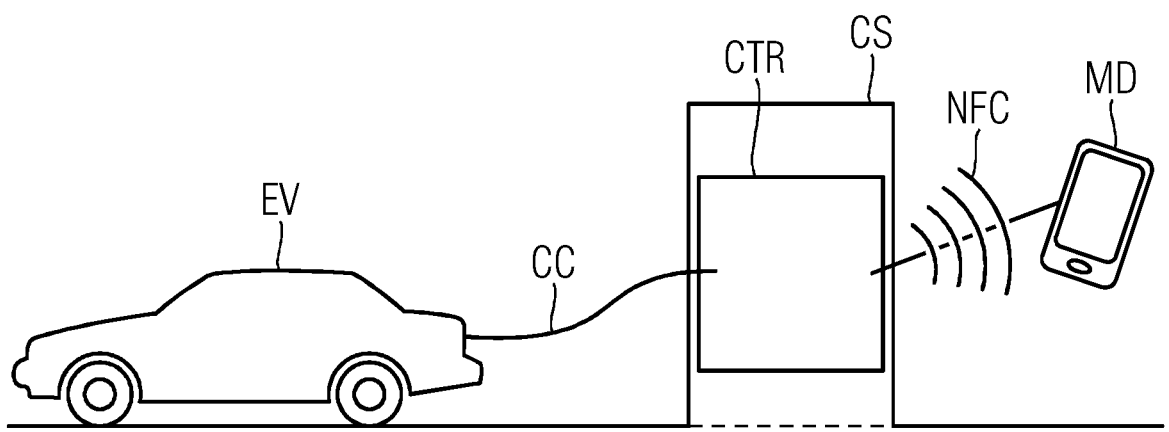

(51) Int. Cl.
*B60L 53/30* (2019.01)
*B60R 25/24* (2013.01)
*H04W 4/80* (2018.01)
*B60L 53/16* (2019.01)
*B60L 53/66* (2019.01)
*B60L 53/18* (2019.01)

(52) U.S. Cl.
CPC ............... *H04W 4/80* (2018.02); *B60L 53/16* (2019.02); *B60L 53/18* (2019.02); *B60L 53/665* (2019.02); *B60L 2270/34* (2013.01); *B60R 2325/101* (2013.01); *B60R 2325/103* (2013.01); *B60R 2325/108* (2013.01); *B60R 2325/205* (2013.01)

(58) Field of Classification Search
CPC ....... B60R 2325/108; B60R 2325/205; H04W 4/80; B60L 53/305; B60L 53/665; B60L 53/16; B60L 53/18; B60L 2270/34
USPC .......................................................... 455/41.1
See application file for complete search history.

(56) References Cited

U.S. PATENT DOCUMENTS

| | | | | |
|---|---|---|---|---|
| 8,487,584 | B2* | 7/2013 | Taylor-Haw | G06Q 20/127 320/109 |
| 10,336,206 | B2* | 7/2019 | Uyeki | B60L 53/305 |
| 2007/0126395 | A1* | 6/2007 | Suchar | B60L 1/003 320/109 |
| 2010/0013434 | A1 | 1/2010 | Taylor-Haw et al. | |
| 2010/0274570 | A1* | 10/2010 | Proefke | B60L 53/30 705/1.1 |
| 2015/0306967 | A1* | 10/2015 | Cohen | B60L 53/68 701/32.3 |
| 2016/0375783 | A1 | 12/2016 | Uyeki et al. | |

FOREIGN PATENT DOCUMENTS

| | | |
|---|---|---|
| DE | 102015107395 A1 | 11/2016 |
| DE | 102016207341 A1 | 11/2017 |
| FR | 3002100 A1 | 8/2015 |
| WO | 2013144954 A1 | 10/2013 |

* cited by examiner

METHOD FOR A TWO-STAGE AUTHORIZATION OF A CHARGING PROCESS ON A CHARGING POST

The invention relates to a method for a two-stage authorization of a charging operation at a charging station, a control device for a charging station and a charging station for charging a vehicle with electric energy.

Electric vehicles or at least partially electrically powered vehicles comprise at least one accumulator, which is to be charged regularly during operation of the electric vehicle. For charging, the electric vehicle is parked at a charging station in order to charge its accumulators via an electric cable or by means of induction coils.

For billing the withdrawn electric energy or any other charging service, the operator of a charging station must at least have knowledge of an identification date which is unambiguously assignable to an identity of the charging station user and which enables identification by third parties for billing, if necessary. During an authorization, it is verified whether an identified charging station user also has the required authorization.

In the state of the art, methods are known which allow to carry out such identification and authorization of a charging station user at a charging station. For example, the use of cards or credit cards for the wireless identification of a charging station user is well-known. The cardholder's authorization is verified in the charging station—optionally with the participation of an authorization server that is remote from the charging station—by means of the transferred identification data of the card, before the charging station approves charging.

Furthermore, mobile terminal devices, in particular Smart Phones or Smart Watches, are used in connection with a corresponding application to identify the charging station user. After confirmation of the identity—which is optionally accompanied by additional authentication features such as PIN entry etc.—an authorization is carried out, i.e. a determination as to whether the identified charging station user is authorized for use, followed by a choice and an approval of charging of the charging station desired by the charging station user.

In order to facilitate operation of the charging station, considerations have been made to envisage a proof of authorization held on the vehicle side which, after the charging cable has been connected, is transmitted from the vehicle to the charging station, and on the basis of which an identification and authorization of a charging station user belonging to or assignable to the vehicle is enabled without the charging station user having to provide further proof of authorization—for example by entering or transferring identification data or passwords.

A transmission of the vehicle-side proof of authorization is carried out by means of a customarily designed data transmission between the charging station and the vehicle, for example by means of Powerline Communication or PLC, or via a data line which extends parallel to the charging cable or is integrated in the charging cable and extends parallel to a charging line. Such a user-action-free authorization is also known among experts as "Plug & Charge"—following the paradigm known from software development as "Plug & Play".

A charging station operator considers authorization to be necessary, in particular for protection against vandalism. An authorization conducing to this purpose is intended to ensure that a charging cable of the charging station is only released—for example, a plug at the end of the charging cable envisaged for the electrical connection to the vehicle is only unlocked at the charging station—when a responsible charging station user has been identified and authorized. In this way, willful damage to the charging station periphery shall be prevented.

Up to now, however, in the state of the art no methods are known that combine the advantages of "Plug & Charge"—i.e. a user-action-free authorization of the charging operation based on a vehicle-side proof of authorization—with an authorization for the release of the charging cable which is demanded for vandalism protection. The problem is that the transmission of the vehicle-side proof of authorization requires a charging cable that is released and connected to the vehicle. An authorization demanded for vandalism protection should, however, begin earlier and possibly prevent a connection of the charging cable to the vehicle which is necessary for the authorization of the charging operation.

It is the object of the present invention to provide a largely user-action-free method which combines an authorization for releasing a charging cable with an authorization for the approval of a charging operation on the basis of a vehicle-side proof of authorization.

The object is achieved by a method having the features of claim 1.

The method according to the invention envisages a two-stage authorization of a charging operation at a charging station. The charging station is configured for charging a vehicle by means of a charging cable.

In a first step, a control device allocated to the charging station receives a terminal-side proof of authorization transmitted by a mobile terminal device via a near-field communication link. An application executed on the terminal device and the near-field communication link established between the terminal device and the control device support a user-action-free method, in particular by the fact that the transmission of the terminal-side proof of authorization is carried out without special additional actions. This is achieved in an advantageous embodiment in particular by the fact that the mobile terminal device is carried, for example as a Smart Watch, in an arm region of a charging station user, or that the terminal device is carried, for example as a Smart Phone, in an region close to the body of the charging station user. Both alternatives have the advantage that a verification of the terminal-side proof of authorization following in a subsequent method step, as well as a release of the charging cable also following in a subsequent method step are carried out immediately and largely unnoticed by the charging station user in case of a positive result of the verification.

In a second step, the control device carries out the aforementioned verification of the terminal-side proof of authorization. During such verification it is checked, for example, whether a preferable personal authorization of the transferred terminal-side proof of authorization can be granted on the basis of control device internal entries, or whether an authorization of the charging station user cannot be granted or has been withdrawn in the meantime due to his transferred terminal-side proof of authorization.

The terminal-side proof of authorization, among experts also known as credential, conduces to a temporary proof of an identity of the charging station user and may contain one or more authenticity marks, usually represented by digital cryptographic signatures in the current state of the art. The proofs of authorization delivered by the mobile terminal device or the signatures contained therein can be verified optionally or additionally by an instance outside the control device, in particular by an authorization server which is connected to the charging station via a data network or via a control line. For this purpose, the verifying instance can, among other things, completely or partially verify the cryptographic signatures by means of corresponding key material. This key material can be obtained from the terminal device, possibly in the form of an object authenticated by a third party, which is trustworthy for the terminal device and the control device or the authorization server, respectively.

The wireless near-field communication link according to the invention for connection to the mobile terminal device is configured for an exchange of at least a portion of the terminal-side proof of authorization. A near field communication interface or near field communication in the sense of this description comprises all wireless communication modes which are not based on a transmission method with a cellular mobile radio network. In particular, the term near-field communication interface or near-field communication in the sense of this description is not limited to the similarly denoted transmission method "Near Field Communication" or NFC for the contactless exchange of data via electromagnetic induction.

In case of a positive result of this verification of the terminal-side proof of authorization by the control device, a first authorization is established. The first authorization of the two-stage authorization method according to the invention is advantageously personal, i.e. directed to an authorized charging station user.

In a third step, the charging cable is released on the basis of the first authorization. According to the invention, the first authorization has the effect that the charging station user can remove the plug of the charging cable from the charging station in order to plug it into his vehicle. The charging cable is released, for example, by unlocking the plug at the charging station or by releasing the plug by opening a cover covering the plug at the charging station.

In a fourth step, a vehicle-side proof of authorization is received by the control device. This reception of the vehicle-side proof of authorization preferably occurs after the vehicle has been connected to the charging cable, which conductively and communicatively connects the charging station with the vehicle.

In a fifth step, a verification of the received vehicle-side proof of authorization is carried out by the control device and, in case of a positive result of the verification, a second authorization is established.

In a sixth step, the charging operation is approved on the basis of the second authorization. The approval of the charging operation for a given second authorization causes an allocation of the charging station to the vehicle, whereupon charging of the vehicle is started or can be started. The vehicle-side proof of authorization, among experts also known as credential, conduces to a possibly temporary proof of an identity of the vehicle and can indirectly also be allocated to the identity of the charging station user. This is the case, for example, if the charging station user is also the owner of the vehicle.

In other important cases of application, the owner of the vehicle is not identical to the charging station user, for example in case of car sharing or rental vehicles. A further advantage of the two-stage authorization according to the invention is shown here by the fact that an authorization of the owner on the basis of the vehicle-side proof of authorization can indeed be given, but an authorization of the use of a charging station can already be denied on the basis of a negative result of the verification of the terminal-side proof of authorization. Since an unauthorized charging station user does not obtain access to the charging cable, it is also not possible for him to obtain the second authorization, as the receipt of the vehicle-side proof of authorization fails due to the missing release of the charging cable. This possibility of excluding a charging station user due to a blocking, so that he cannot obtain authorization via the vehicle-side proof of authorization with a foreign identity, is a substantial advantage of the invention.

Conversely, there can arise the case that an authorized charging station user may obtain access to the charging cable, but authorization on the basis of the vehicle-side proof of authorization may fail, for example due to a blocking of the vehicle owner as a result of outstanding invoices. This possibility of excluding a vehicle owner on the basis of a blocking constitutes a further advantage of the invention.

Further embodiments of the invention are the subject of the dependent claims.

In the following, embodiments of the method according to the invention and of the control device according to the invention are described with reference to the enclosed drawing figures.

Figure 2:
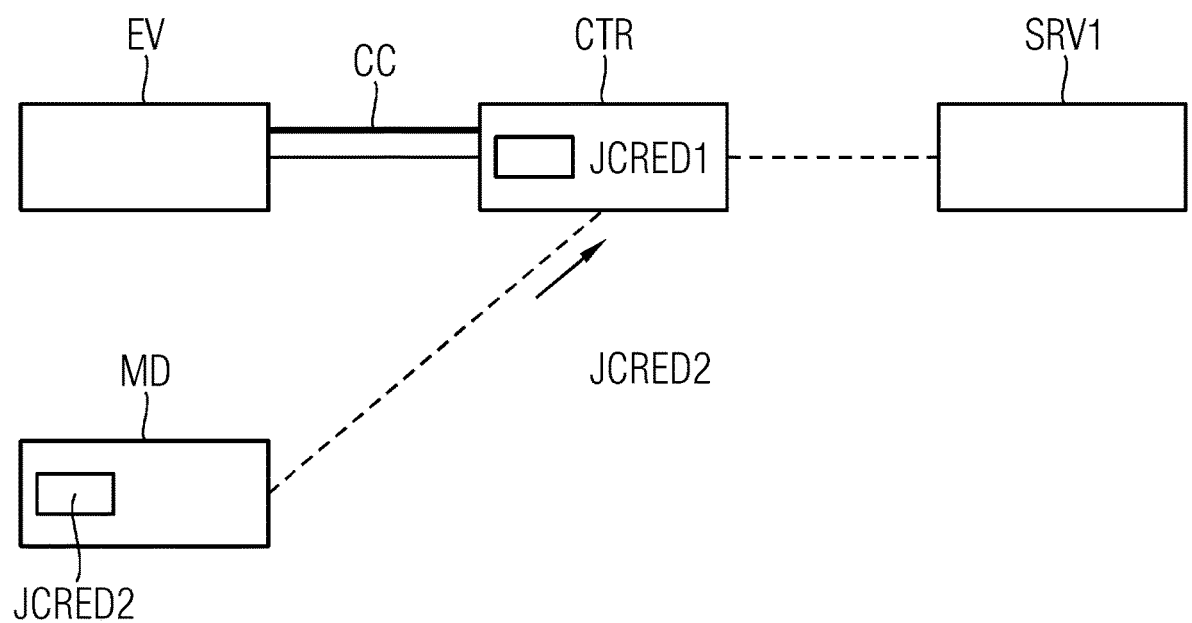

In the drawings:

FIG. 1 shows a block diagram illustrating a charging infrastructure in cooperation with functional units according to the invention; and FIG. 2 shows a flow diagram illustrating an embodiment of the method according to the invention.

FIG. 1 shows a vehicle EV charging at a charging station CS. Energy is transmitted between charging station CS and vehicle EV via a charging cable CC. For the sake of clarity, further customary functional components within charging station CS which relate to the provision and processing of the electrical charging current are not shown. A control device CTR is allocated to or integrated within charging station CS.

Data transmission between vehicle EV and charging station CS is carried out, for example, by means of Powerline Communication, also known as PLC, via charging cable CC, or alternatively via a separate—not shown—data line that extends parallel to charging cable CC.

At a—not shown—stage before charging cable CC of charging station CS has been connected to vehicle EV, i.e. a—not shown—plug of charging cable CC is still locked at charging station CS, a wireless near-field communication link NFC is established at control device CTR for connection to a corresponding near-field communication interface of a mobile terminal device MD.

The wireless and bidirectional near-field communication link NFC between control device CTR and mobile terminal device MD is designed using common near-field communication protocols, for example. These include, for example:

WLAN (Wireless Local Area Network) or WiFi (Wireless Fidelity), for example according to a communication standard of the standard family IEEE 802.11;

Bluetooth according to a communication standard IEEE 802.15.1, Bluetooth Low Energy or BLE according to an extension of the Bluetooth specifications, for example according to Bluetooth Low Energy Specification 4.2; and/or;

transmission methods for the contactless exchange of data by electromagnetic induction using loosely coupled coils, which is also referred to as Near Field Communication.

While a charging station user is reaching for charging cable CC, or even when the charging station user is approaching charging station CS, mobile terminal device MD transmits a—not shown—terminal-side proof of authorization via the previously established near-field communication link NFC.

After receipt of the terminal-side proof of authorization by control device CTR, the terminal-side proof of authorization is verified by control device CTR. During such verification it is checked, for example, whether a preferably personal authorization of the transferred terminal-side proof of authorization can be granted on the basis of control device internal entries, or whether an authorization of the charging station user cannot be granted or has been withdrawn in the meantime due to his transferred terminal-side proofs of authorization. In case of a positive result of the verification, a first authorization is established according to which charging cable CC is released.

The charging station user can now, without separately noticing the release, remove the charging cable CC from a meanwhile unlocked holder of charging station CS and connect it to vehicle EV.

After charging cable CC is connected to vehicle EV as shown in FIG. 1, control device CTR receives the vehicle-side proof of authorization—not shown in FIG. 1. This receipt of the vehicle-side proof of authorization takes place after vehicle EV has been connected to charging cable CC, which connects the charging station to the vehicle both conductively and communicatively.

Subsequently, a verification of the received vehicle-side proof of authorization is carried out by control device CTR. In case of a positive result of the verification, a second authorization is established and the charging operation is approved on the basis of the second authorization. The approval of the charging operation for a given second authorization causes an allocation of the charging station to the vehicle, whereupon charging of the vehicle is started or can be started.

As shown, the near-field communication link NFC can also be maintained after the charging cable has been plugged in, to control, for example, the charging station during the charging operation via the mobile terminal device MD, to initiate, for example, a control of the charging operation by means of a corresponding entry on the mobile terminal device MD.

Such control may, according to an alternative embodiment, include, for example, the case that a second authorization fails due to a verification of the vehicle-side proof of authorization is failing or is undesired by the charging station user. The latter case of a second authorization being undesired by the charging station user due to a verification of the vehicle-side proof of authorization may occur, for example, if the charging station user wishes billing of the electric energy to be withdrawn on his own account rather than on the basis of the vehicle-side proof of authorization. In this case, the control of the charging operation may comprise that the charging station user causes the approval of charging at his mobile terminal to be authorized not on the basis of the vehicle-side proof of authorization, but on the basis of the terminal-side proof of authorization or another proof of authorization with a personal account of the charging station user.

With the two-stage authorization method according to the invention, the preliminary personal first authorization is replaced by the second authorization. This is particularly advantageous when the vehicle driver is different from an invoice recipient of the charging energy to be invoiced.

The first authorization insofar conduces to a vandalism protection. It is possible for the charging station operator to block certain charging station users on the basis of their terminal-side proofs of authorization, for example due to a previous misuse of charging station CS.

Control device CTR optionally comprises means for maintaining data communication with a—not shown—authorization server. The authorization server supports user administration, identification and authorization by charging station CS for the charging operation in a well-known way. In addition, this or another server can undertake other tasks such as determining and billing the electric energy withdrawn from charging station CS.

FIG. 2 shows a flow diagram illustrating an embodiment of the method according to the invention. In accordance with this embodiment of the method according to the invention, it is envisaged that the terminal-side proof of authorization JCRED2 is transferred to control device CTR allocated to charging station CS. Such method is executed in accordance with the invention when the charging station user, together with his mobile terminal device MD, enters the effective range of the near-field communication link NFC established or prepared by control device CTR.

In a direct vicinity of a plurality of charging stations CS, a control link is established to several unoccupied charging stations CS, i.e. charging stations ready for operation and reception, and several potential control links to mobile terminal device MD are provided, when the terminal-side proof of authorization JCRED2 is delivered. Only by connecting the charging cable CC, an allocation between charging station CS and vehicle EV is established. All other charging stations CS not allocated within a definable period of time terminate the control link as a result of a timeout, alternatively or additionally also by an active instruction from the mobile terminal device MD.

To this purpose, a near-field communication interface NFC is formed on the side of control device CTR, via which a transmission of at least a portion of the terminal-side proof of authorization JCRED2 is caused. This terminal-side proof of authorization JCRED2 is received and temporarily verified by control device CTR.

Depending on whether the charging station CS operates largely stand-alone, or whether a connection and administration of several charging stations by one or more central instances is envisaged, an identification and verification of authorization using the terminal-side proof of authorization JCRED2 by an authorization server SRV1 or with its participation, which is connected to control device CTR via a data network or via a—dashed drawn—control line, can be envisaged.

In case of a positive result of the verification, charging cable CC is released and the charging station user can now connect charging cable CC of charging station CS to a charging socket of vehicle EV.

With a connection of charging cable CC between charging station CS and vehicle EV, the vehicle-side proof of authorization JCRED1 held in vehicle EV is transmitted to control device CTR via a data link between vehicle EV and control device CTR—shown in the drawing parallel to the thicker drawn charging cable CC—and is received by the control device CTR.

Control device CTR processes the received vehicle-side proof of authorization JCRED1 such that an allocation can be established between charging station CS—to which control device CTR is allocated—and vehicle EV. For this purpose, at least a portion of the vehicle-side proof of authorization JCRED1 is evaluated, which comprises, for example, a machine-readable characterization of vehicle EV and/or of the vehicle owner.

Also for the second authorization, an at least partial identification and verification of authorization by authorization server SRV1 by means of the proof of authorization JCRED1 transferred by vehicle EV can be envisaged.

In accordance with an advantageous further development of the invention, it is envisaged to provide a Media Access Control address or MAC address of the vehicle as part of the vehicle-side proof of authorization JCRED1 and/or of the terminal-side proof of authorization JCRED2. This measure is particularly advantageous since the MAC address of the vehicle is currently already used for a communication between vehicle EV and charging station CS.

To protect against manipulation by malicious charging station users or also against malicious charging station operators, a cryptographic protection of the data communication and certificate-based verification of the proofs of authorization JCRED1; JCRED2 can be carried out in various further developments of the invention.

According to an advantageous further development of the invention, it is envisaged to cryptographically protect the near-field communication link NFC between control device CTR and mobile terminal device MD. The protection is preferably carried out with the involvement of a digital certificate for the cryptographically protected confirmation of properties, in particular of a public key certificate for the confirmation of public keys.

In one embodiment, the involvement of a provisionally verified digital certificate is envisaged. In accordance with this embodiment, a transmission of a provisionally verified digital certificate of mobile terminal device MD or of a verification information extracted therefrom by mobile terminal device MD via NFC near-field communication link to control device CTR is envisaged, by which control device CTR, optionally in cooperation with authorization server SRV1, performs an authorization verification of mobile terminal device MD. Subsequently, a result of this verification is transferred from authorization server SRV1 to control device CTR, which, depending on the received authorization verification result, approves a control of charging station CS by mobile terminal device MD, or not.

Depending on the implementation, the provisionally verified digital certificate is either part of the terminal-side proof of authorization JCRED2, or the terminal-side proof of authorization JCRED2 is part of the provisionally verified digital certificate. This also applies to the vehicle-side proof of authorization JCRED1.

In one embodiment of the method according to the invention, the near-field communication link NFC is cryptographically protected by means of a protocol for encrypting data transmissions, for example by means of Transport Layer Security or TLS, Secure Sockets Layer or SSL, or Internet Protocol Security or IPsec.

With an advantageous further development of the invention, the communication links between control device CTR and authorization server SRV1, as well as between control device CTR and vehicle EV are also each or in total cryptographically protected.

In one embodiment, the result of the verification comprises charging rules for controlling the charging operation by charging station CS. As an alternative to the charging rules themselves, control data or control signals for activating such charging rules by an on-board control device of vehicle EV—which is not shown—may also be transmitted from control device CTR or from authorization server SRV1 via control device CTR to the on-board control device. These charging rules may also reside in a data memory of the on-board control device of vehicle EV, to which control device CTR of charging station CS has access.

In summary, the method for a two-stage authorization of a charging operation according to the invention ensures a largely user-action-free method, by which in a first stage, a personal authorization of a charging station user for the release of a charging cable is effected, and in a second stage, an authorization for the approval of a charging operation is effected on the basis of a vehicle-side proof of authorization received via the connected charging cable. In the first stage, a control device allocated to the charging station receives a terminal-side proof of authorization transmitted from a mobile terminal device, which is designed as a Smart Watch, for example. The first personal authorization of the charging station user is verified on the basis of the terminal-side proof of authorization, without any action of the charging station user being required. With the given first authorization, the charging cable is released. In a second stage, the vehicle-side proof of authorization is received and verified after the vehicle has been connected to the charging cable, whereupon in case of a positive result of the verification, a second authorization is carried out, due to which the charging operation is approved.

The invention claimed is:

1. A method for a two-stage authorization of a charging operation at a charging station, comprising:
   receiving, by a control device allocated to the charging station, a terminal-side proof of authorization transmitted by a mobile terminal via a near-field communication link, the charging station charging a vehicle via a charging cable;
   verifying the terminal-side proof of authorization by the control device and, in response to verification of the terminal-side proof of authorization, establishing a first authorization,
   releasing the charging cable due to the first authorization;
   receiving a vehicle-side proof of authorization by the control device;
   verifying the vehicle-side proof of authorization by the control device and, in response to verification of the vehicle-side proof of authorization, establishing a second authorization; and
   approving the charging operation due to the second authorization.

2. The method of claim 1, wherein the mobile terminal device is carried by a charging station user.

3. The method of claim 1, wherein the mobile terminal device is a Smart Watch or a Smart Phone.

4. The method of claim 1, wherein the charging cable is released by releasing a vehicle-side plug at one end of the charging cable.

5. The method of claim 3, wherein the charging cable is released by unlocking of the plug.

6. The method of claim 3, wherein the charging cable is released by opening a cover covering the plug.

7. The method of claim 1, wherein the near-field communication link operates a local radio network according to a communication standard of the standard family IEEE 802.11.

8. The method of claim 1, wherein the near-field communication link operates a local radio network according to a communication standard IEEE 802.15.1.

9. The method of claim 1, wherein the near-field communication link operates a local radio network according to Bluetooth specification 4.2.

10. The method of claim 1, wherein the verification of at least one proof of authorization is performed, in part, in cooperation with at least one authorization server.

11. The method of claim 1, wherein a cryptographically protected data link is established via the near-field communication link.

12. The method of claim 1, wherein the terminal-side proof of authorization and/or the vehicle-side proof of authorization comprise a digital certificate.

13. The method of claim 1, wherein a digital certificate comprises the terminal-side proof of authorization and/or the vehicle-side proof of authorization.

14. An apparatus for two-stage authorization of a charging operation at a charging station, the apparatus comprising:
   a memory; and
   at least one processor coupled to the memory, the at least one processor configured:
      to receive, from a control device allocated to the charging station, a terminal-side proof of authorization transmitted by a mobile terminal via a near-field communication link, the charging station configured for charging a vehicle via a charging cable;
      to verify the terminal-side proof of authorization and, in response to verification of the terminal-side proof of authorization, establish a first authorization,
      to release the charging cable in response to the first authorization;
      to receive a vehicle-side proof of authorization from the control device;
      to verify the vehicle-side proof of authorization by the control device and, in response to a positive result of verification of the vehicle-side proof of authorization, establish a second authorization; and
      to approve the charging operation in response to the second authorization.

15. The apparatus of claim 14, wherein the mobile terminal device is carried by a charging station user.

16. The apparatus of claim 14, wherein the mobile terminal device is a Smart Watch or a Smart Phone.

17. The apparatus of claim 14, wherein the at least one processor is further configured to release the charging cable by releasing a vehicle-side plug at one end of the charging cable.

18. The apparatus of claim 17, wherein the at least one processor is further configured to release the charging cable by unlocking the plug.

19. The apparatus of claim 17, wherein the at least one processor is further configured to release the charging cable by opening a cover covering the plug.

20. The apparatus of claim 14, wherein the near-field communication link operates a local radio network according to a communication standard of the standard family IEEE 802.11.

\* \* \* \* \*